United States Patent
Seung et al.

(10) Patent No.: US 7,200,086 B2
(45) Date of Patent: Apr. 3, 2007

(54) COPY-PROTECTED OPTICAL RECORDING MEDIUM AND A METHOD FOR MANUFACTURING THEREOF

(75) Inventors: Heung-Chan Seung, Seoul (KR); Byeongseok Oh, Seoul (KR)

(73) Assignee: Settec Inc., Seoul (KR)

( * ) Notice: Subject to any disclaimer, the term of this patent is extended or adjusted under 35 U.S.C. 154(b) by 492 days.

(21) Appl. No.: 10/477,423

(22) PCT Filed: Feb. 26, 2003

(86) PCT No.: PCT/KR03/00388

§ 371 (c)(1),
(2), (4) Date: May 26, 2004

(87) PCT Pub. No.: WO03/077242

PCT Pub. Date: Sep. 18, 2003

(65) Prior Publication Data

US 2004/0196764 A1    Oct. 7, 2004

(30) Foreign Application Priority Data

Mar. 14, 2002  (KR) .................... 10-2002-0013866

(51) Int. Cl.
*G11B 7/00* (2006.01)

(52) U.S. Cl. .................. 369/53.21; 369/26.01; 369/47.12

(58) Field of Classification Search ........... 369/53.21, 369/26.01, 47.12, 30.05, 30.19, 47.51, 53.34, 369/13.02, 275.3, 13.47, 59.25; 713/165–167, 713/193–194; 705/52, 57; 380/202–203; 726/27

See application file for complete search history.

(56) References Cited

U.S. PATENT DOCUMENTS 5,661,800 A * 8/1997 Nakashima et al. .......... 726/27
6,078,552 A * 6/2000 Yamamoto et al. ...... 369/47.51
7,057,993 B2 * 6/2006 Barnard et al. .......... 369/53.21

FOREIGN PATENT DOCUMENTS

EP        1 067 540       7/2000
WO        WO 98/54713    12/1998
WO        WO 01/59774  *  8/2001

* cited by examiner

*Primary Examiner*—Ali Neyzari
(74) *Attorney, Agent, or Firm*—Stein, McEwen & Bui, LLP

(57) ABSTRACT

A copy-protected optical recording medium and a method for manufacturing thereof is provided, wherein the medium has at least two auxiliary sections for confusing control of a copying machine.

14 Claims, 7 Drawing Sheets

COPY-PROTECTED OPTICAL RECORDING MEDIUM AND A METHOD FOR MANUFACTURING THEREOF

TECHNICAL FILED

The present invention relates to a copy-protected optical recording medium on/from which digital contents such as audio contents recorded/reproduced and a method for manufacturing thereof, and more particularly to an optical recording medium prevented from being copied by manipulating control information in a lead-in area and a method for manufacturing thereof.

The present invention relates to an optical recording medium, which is or will be in existence, such as an audio compact disc, a combination of compact discs, a compact disc including other optical recording medium and a compact disc included in other optical recording medium.

BACKGROUND ART

As known so far, the optical recording medium storing information on one side or both sides of it has been used for various purposes, especially in music, game, video and computer industries. Digital information is stored in a form of pits with a predetermined size and interval along the tracks formed on one side or two sides of the disc.

According to "copy managing system of an optical disc" (Korean Patent Application Publication No. 1999-23961), one of the methods already known, manufacturing an optical recording medium as mentioned above, a glass master first is formed by exposing a photoresist spread over a glass substrate using a laser or light. The exposed pattern corresponds to the pattern of the digital information stored in the disc last.

Then an indentation, which is called a pit, is formed in the single spiral of the glass master by removing the exposed area through etching or developing process. The pattern and length of the indentation along the tracks represent the recorded information digitally. And a nickel master, which is a tool for molding duplicates in the following forming process, is then formed by applying the galvanized nickel to the glass master in the electroforming process.

The patterns of the nickel master, generally called a pit and a land (or mirror area) respectively, are formed by transcribing on a polycarbonate or PMMA substrate. The stamped duplicate is coated with a reflection layer and added a protection layer for preventing the reflection layer from oxidizing.

In order to read the optical recording medium manufactured in the manner above, the surface of the disc is irradiated to laser beams, which are oscillated with the predetermined frequency and power. There is a difference of the intensity of the reflected laser beams between in case the beams are applied to the mirror area and in case to the pit, and a reproducing apparatus (which is capable of only reproducing the optical recording medium) including a reading part, called the optical pick-up, recognizes the difference of the intensity of the reflected beams as digital information of 0 or 1 so that the digital information recorded on the optical recording medium can be reproduced.

The optical recording medium has developed from the compact disc (audio CD), which is mainly for reproducing the audio contents, and currently the compact disc is used for storing the data of a computer in a form of the read-only memory (CD-ROM) or reproducing the audio contents in a computer equipped with an audio CD driver by adding computer-readable information to the audio CD.

However, as the information recorded on the optical recording medium can be read by a reproducing apparatus, for example, a CD-ROM driver with which an general personal computer is equipped, the contents on the recording medium are not only reproduced, but also illegal copying of the contents prevails. Therefore, a serious problem how to protect the copyright of the contents on the recording medium rises.

Generally, when the audio CD or the CD-ROM is copied, the information on the lead-in area, namely TOC (Table Of Contents), such as the information stored in the recording medium and the predetermined control information, should be read, so there has been a try to solve the problem above. That is, according to "CD reproducing control method without TOC" (Korean Patent No. 200879), in order to prevent the illegal copying of the information on the recording medium by removing the TOC of the CD-ROM or the audio CD and reproduce both the recording medium prevented from being copied illegally and a general recording medium, it is disclosed that a reproducing control method of a CD without a TOC for preventing the illegal copying, includes the steps of:

(1) verifying whether the TOC is read,
(2) going to a predetermined track and reading information from the track, if the TOC is not read in the step (1),
(3) verifying whether the information, which is read in the step (2), is read from the recording medium without the TOC and
(4) reading in accordance with a new format if the recording medium does not have the TOC, or reading in accordance with a general format if the information is from the lead-in area in the step (3).

According to the method above, However, there is a problem that it is impossible to reproduce the contents recorded on a copy-protected recording medium only with a general reproducing apparatus, because the TOC of the recording medium should be removed artificially, and the reproducing apparatus should be specially programmed and carried out in accordance with the steps above. That brings users a problem that they have to buy an appropriate reproducing apparatus anew besides the recording medium.

DISCLOSURE OF INVENTION

Therefore, it is an object of the present invention to provide a copy-protected optical recording medium capable of being reproduced by a general reproducing apparatus and a method for manufacturing thereof, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an optical recording medium protected from being copied by a general recording/reproducing apparatus but capable of being reproduced by a general reproducing apparatus, comprises a content session in which content information to be reproduced by the reproducing apparatus is stored and a first and second auxiliary sessions for preventing the recording/reproducing apparatus from copying the content information, wherein the content session comprises control information for guiding the recording/reproducing apparatus to the first auxiliary session therein, the first auxiliary session comprises control information for guiding the recording/ reproducing apparatus to the second auxiliary session therein, and the second auxiliary session comprises control information for guiding the recording/reproducing apparatus to the first auxiliary session therein.

The content session may be an audio session storing audio information. The audio session may comprise a lead-in area with a TOC(Table Of Contents), at least one track storing audio content information and a lead-out area, and the control information for guiding the recording/reproducing apparatus to the first auxiliary session may be in the TOC of the audio session.

The control information for guiding the recording/reproducing apparatus may be that a value of "B0" is recorded on a point field of Q sub channel of predetermined one of frames recorded on the lead-in area of the audio session, and the address of the first auxiliary session is recorded on absolute time code fields of the Q sub channel on which the value of "B0" is recorded.

Both of the first and second auxiliary sessions may comprise a lead-in area with a TOC, at least one auxiliary track and a lead-out area, the control information for guiding the recording/reproducing apparatus to the second auxiliary session may be in the TOC of the first auxiliary session, and the control information for guiding the recording/reproducing apparatus to the first auxiliary session may be in the TOC of the second auxiliary session.

The control information of the first auxiliary session for guiding the recording/reproducing apparatus may be that a value of "B0" is recorded on a point field of Q sub channel of predetermined one of frames recorded on the lead-in area of the first auxiliary session, and the address of the second auxiliary session is recorded on absolute time code fields of the Q sub channel on which the value of "B0" is recorded, while the control information of the second auxiliary session for guiding the recording/reproducing apparatus may be that a value of "B0" is recorded on a point field of Q sub channel of predetermined one of frames recorded on the lead-in area of the second auxiliary session, and the address of the first auxiliary session is recorded on absolute time code fields of the Q sub channel on which the value of "B0" is recorded.

The optical recording medium may further comprise at least one the content session additionally, wherein each of the content sessions except the last content session may comprise control information for guiding the recording/reproducing apparatus to the next content session, and the last content session may comprise control information for guiding the recording/reproducing apparatus to the first auxiliary session.

According to the second aspect of the present invention, a method for manufacturing an optical recording medium protected from being copied by a general recording/reproducing apparatus but capable of being reproduced by a general reproducing apparatus, comprises the steps of (a)forming a content session in which content information to be reproduced by the reproducing apparatus is stored and (b)forming a first and second auxiliary sessions for preventing the recording/reproducing apparatus from copying the content information, wherein control information for guiding the recording/reproducing apparatus to the first auxiliary session is stored in a predetermined area of the content session in the step (a), control information for guiding the recording/reproducing apparatus to the second auxiliary session is stored in a predetermined area of the first auxiliary session in the step (b), and control information for guiding the recording/reproducing apparatus to the first auxiliary session is stored in a predetermined area of the second auxiliary session in the step (b).

The content session may be an audio session storing audio information. The audio session may comprise a lead-in area with a TOC(Table Of Contents), at least one track storing audio content information and a lead-out area, and the control information for guiding the recording/reproducing apparatus to the first auxiliary session may be in the TOC of the audio session.

The control information for guiding the recording/reproducing apparatus may be that a value of "B0" is recorded on a point field of Q sub channel of predetermined one of frames recorded on the lead-in area of the audio session, and the address of the first auxiliary session is recorded on absolute time code fields of the Q sub channel on which the value of "B0" is recorded.

Both of the first and second auxiliary sessions may comprise a lead-in area with a TOC, at least one auxiliary track and a lead-out area, the control information for guiding the recording/reproducing apparatus to the second auxiliary session may be in the TOC of the first auxiliary session, and the control information for guiding the recording/reproducing apparatus to the first auxiliary session may be in the TOC of the second auxiliary session.

The control information of the first auxiliary session for guiding the recording/reproducing apparatus may be that a value of "B0" is recorded on a point field of Q sub channel of predetermined one of frames recorded on the lead-in area of the first auxiliary session, and the address of the second auxiliary session is recorded on absolute time code fields of the Q sub channel on which the value of "B0" is recorded, while the control information of the second auxiliary session for guiding the recording/reproducing apparatus may be that a value of "B0" is recorded on a point field of Q sub channel of predetermined one of frames recorded on the lead-in area of the second auxiliary session, and the address of the first auxiliary session is recorded on absolute time code fields of the Q sub channel on which the value of "B0" is recorded.

The method for manufacturing an optical recording medium may further comprise a step of forming at least one the content session additionally, wherein each of the content sessions except the last content session may comprise control information for guiding the recording/reproducing apparatus to the next content session, and the last content session may comprise control information for guiding the recording/reproducing apparatus to the first auxiliary session.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BEST MODE FOR CARRYING OUT THE INVENTION

The invention will now be described based on the preferred embodiments, which do not intend to limit the scope of the present invention, but exemplify the invention. All of the features and the combinations thereof described in the embodiment are not necessarily essential to the invention.

Embodiments of the present invention will be described with the attached drawings by taking a compact disc, a kind of an optical recording medium, as an example.

Figure 1:
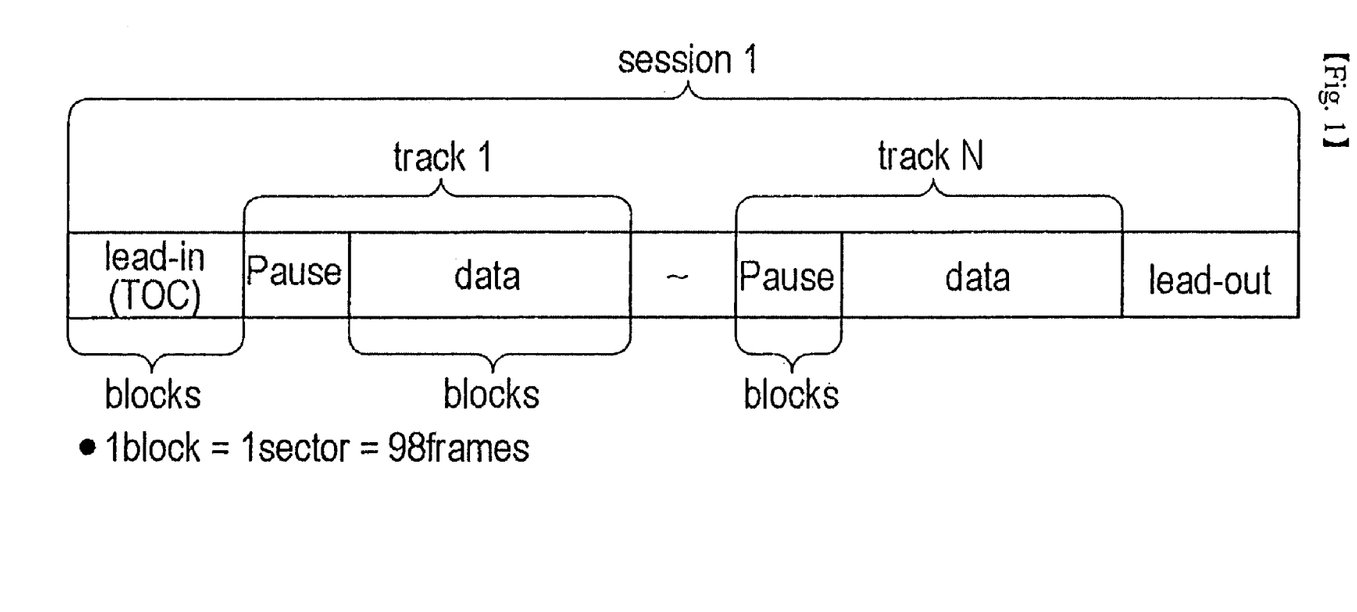
FIG. 1 shows the information, of which a session consists, imaginarily placed in a row, and recorded on the audio CD in accordance with the Red Book Standard.

A standard, which is called "Red Book Standard", has been presented in regard to a format for recording the audio contents, such as music, on the compact disc. According to the Red Book Standard, the audio CD has a number of tracks and the tracks are indexed and systematized. Referring to FIG. 1, FIG. 1 shows the information, of which a session consists, imaginarily placed in a row, and recorded on the audio CD in accordance with the Red Book Standard. As shown in FIG. 1, the audio information recorded on the audio CD includes a lead-in area, which is first accessed by a reproducing apparatus, a plurality of tracks(track 1 to track N), each of which includes both a pause area and a data area, and a lead-out area, which indicates the end of the session.

Figure 2:
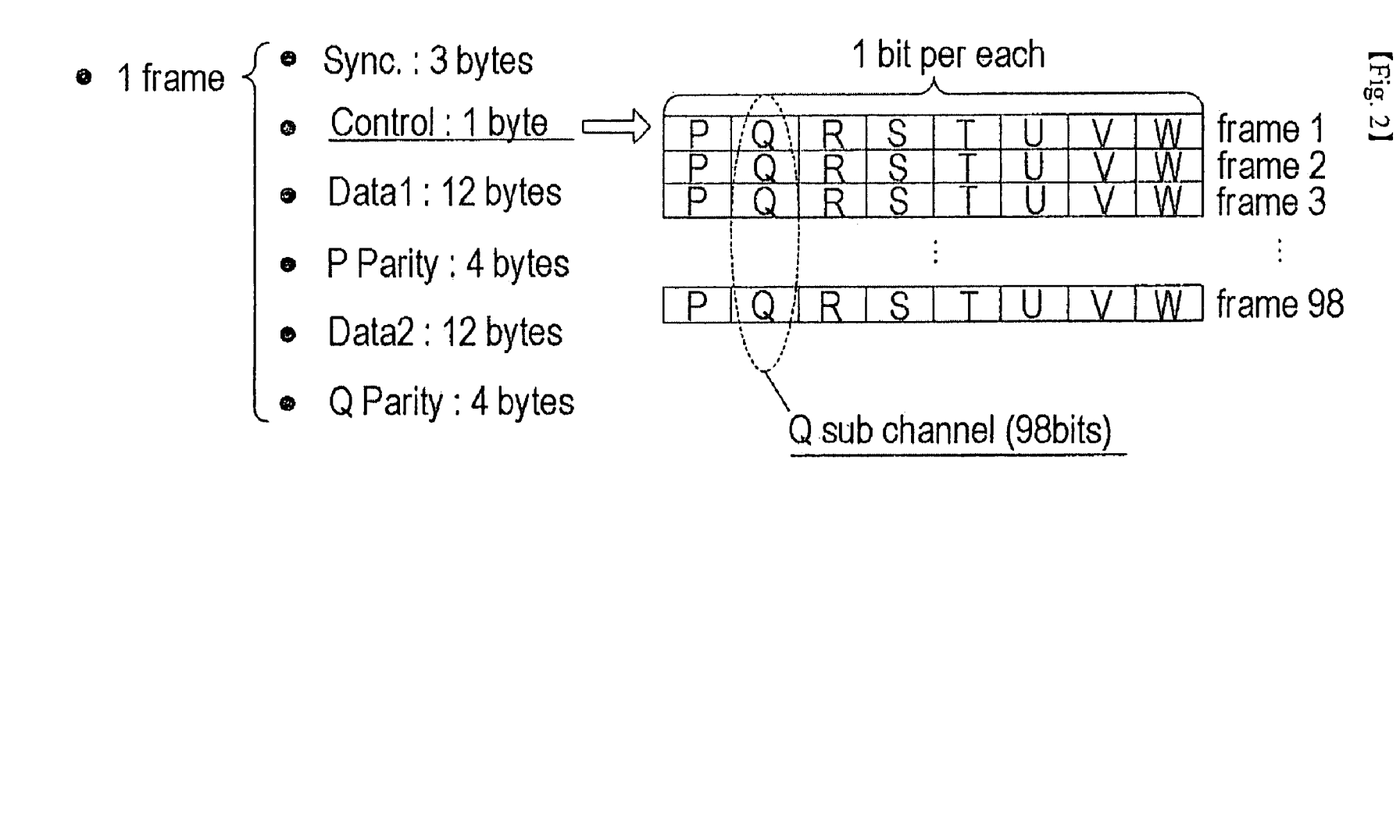
FIG. 2 shows the structure of one of frames of which the information block recorded on the lead-in area of the information shown in FIG. 1 consists.

And also each of the area includes a plurality of information blocks (which are also called "sectors"), and a block includes 98 frames. Each of the frames, of which one of the information blocks recorded on the lead-in area consists, is composed as shown in FIG. 2. That is to say, a frame, which is recorded on the lead-in area, includes synchronization control information of 3 bytes (Sync), control information of 1 byte (Control), first content data information of 12 bytes (Data1), P parity information of 4 bytes (P Parity), second content data information of 12 bytes (Data2) and Q parity information of 4 bytes (Q Parity).

In other words, each of the 98 frames, of which one of the information blocks recorded on the lead-in area consists, includes the control information of 1 byte and the control information of 1 byte consists of 8 sub codes, each of which has information of 1 bit. Each of the 8 sub codes is called P, Q, R, S, T, U, V and W field respectively. The sub codes form 8 sub channels, each of which is called P, Q, R, S, T, U, V and W sub channel respectively, over the 98 frames included in one of the information blocks. Each of the sub channels consists of 98 bits altogether including 2 synchronization bits and 96 data bits.

Figure 3:
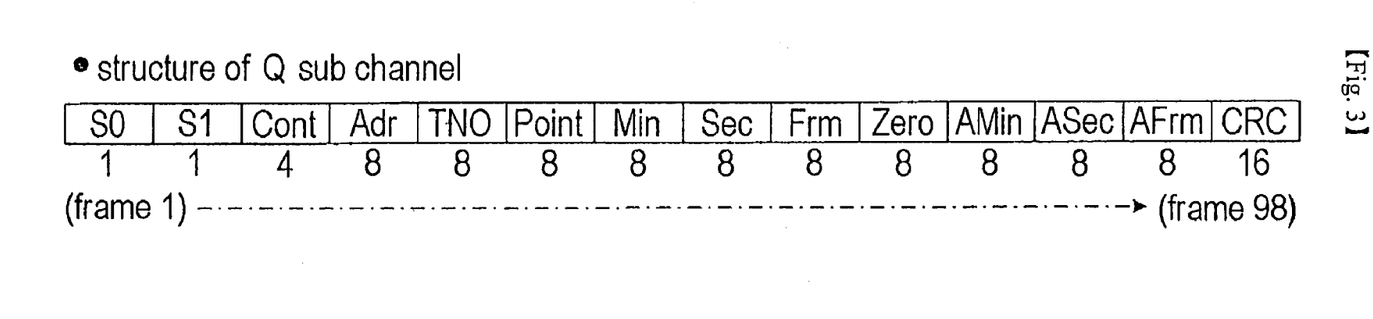
FIG. 3 shows the structure of the Q sub channel of the 8 sub channels consisting of the control information of the frames shown in FIG. 2.

FIG. 3 shows the structure of the Q sub channel of the 8 sub channels consisting of the control information above. Other sub channels (P, R, S, T, U, V and W sub channel) are similar to the Q sub channel but transfer different information. As shown in FIG. 3, the first 2 bits of the Q sub channel represent synchronization patterns S0 and S1. The synchronization patterns S0 and S1 are used for synchronizing the reproducing apparatus to rotate the recording medium with the constant leaner velocity.

Following the synchronization patterns S0 and S1, control (Cont) field of 4 bits is recorded, which indicates the number of audio channels of the contents recorded on the recording medium and the existence of emphasis, and especially may show whether the contents of the track are the audio contents or the data contents storing the computer readable information.

The next 4 bits are address (Adr) field and designate the mode for a format of the Q sub channel. Although mode 1, mode 2, mode 3 etc., for example, are known as the format of the Q sub channel, only the case that the address field value is "0001", that is, the format mode is mode 1, will be described here as an example (if the Q sub channel has the format of mode 1, it has a structure like the format shown in FIG. 3).

Track number (TNO) field follows the address field. 8 bits included in the track number field has a value of 0 to 99 represented in Binary Coded Decimal (BCD) of the second order. Although the value generally indicates the number of the track, the track, where the track number field has a value of "00", is the lead-in track, and the track, where the track number field has a value of "AA", is the lead-out track.

Next, point (Point) field is generally used for indicating the contents by dividing in further detail, represented by the track number, and in this case 8 bits included in the point field has a value of 0 to 99 and indicates the index number in the track. Moreover, in this case three fields indicating an absolute time code of the fields of the Q sub channel shown in FIG. 3, namely, absolute minute (AMin), absolute second (ASec) and absolute frame (Afrm) field respectively have the absolute time values of the track. Here, the absolute time value means the time interval within which the content is reproduced from the first track to the track concerned during the reproduction of the overall recording medium, and the absolute time value is called "address" especially in case of the compact disc. It is because the absolute time value can be used as the information about what address in the recording medium certain information is recorded at.

The values of the Q sub channel and the absolute time code, however, may be used as a different meaning. That is, the value recorded on the absolute time code field (the absolute minute, the absolute second and the absolute frame field), indicates the number of the first track of the session, if the point field included in the Q sub channel of the lead-in area has a value of "A0". Meanwhile, the value recorded on the absolute time code field indicates the number of the last track of the session, if the point field has a value of "A1", and the value recorded on the absolute time code field indicates the address of lead-out area of the session, if the point field has a value of "A2". Particularly, the value recorded on the absolute time code field indicates the address of the next session, if the point field has a value of "B0", and the value recorded on the absolute time code field indicates the address of the first session of the recording medium, if the point field has a value of "C0".

Following the point field, the three fields, minute (Min), second (Sec) and frame (Frm), having the information of 8 bits respectively are recorded as the relative time code fields of the track. The three fields indicate the relative time code of the track in the session.

Following the three fields, zero (Zero) field is included in front of the absolute time code fields. Finally, following the absolute time code fields, crc (CRC) field of 8 bits for error control is included.

Accordingly, by interpreting the information of the Q sub channel of the lead-in area, the reproducing apparatus for the optical recording medium is capable of judging which content is recorded, in which format, at which position on the recording medium and how much quantity of the content.

Therefore, by manipulating the information of the Q sub channel, it is possible not to provide the information required to copy the content without influencing the normal reproducing operation of the reproducing apparatus.

Figure 4:
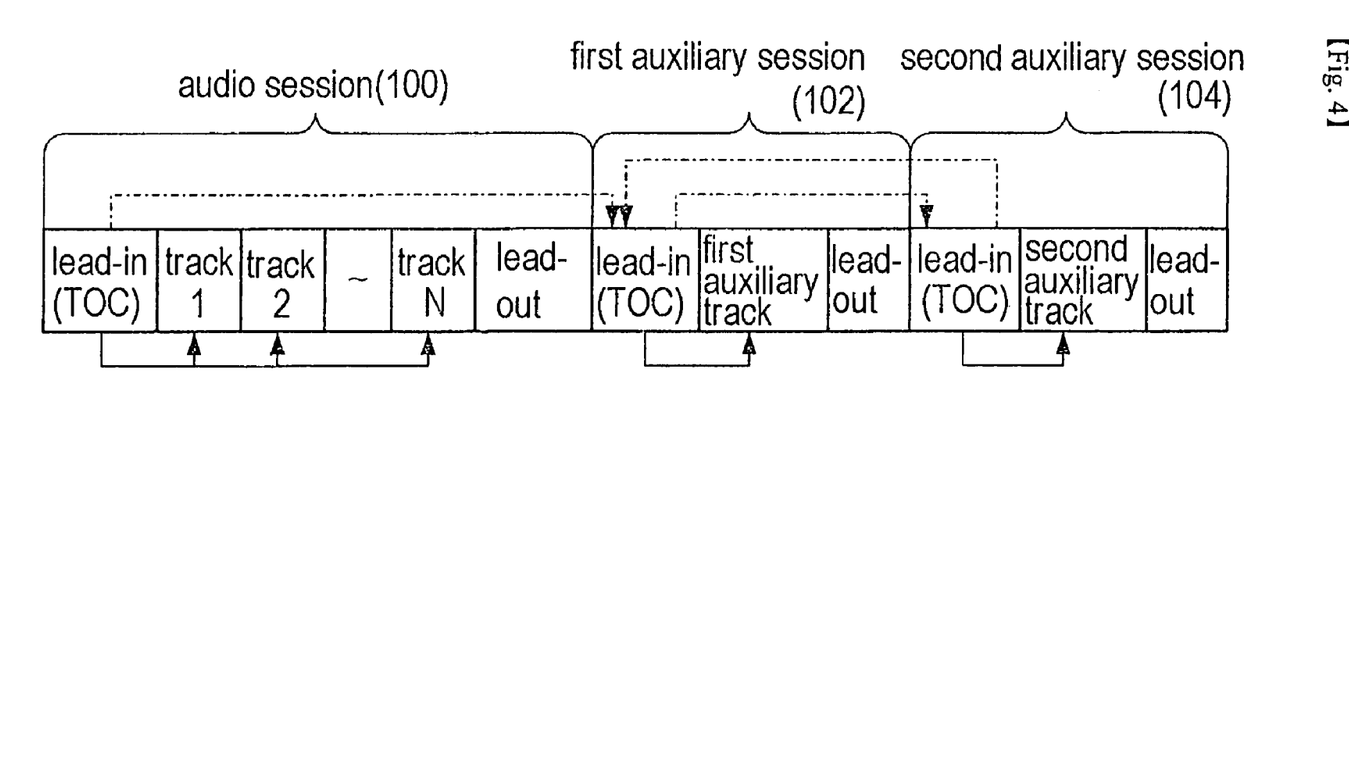
FIG. 4 shows the information, which is imaginarily placed in a row, recorded on the copy-protected optical recording medium according to an exemplary embodiment of the present invention.

FIG. 4 shows the information, which is imaginarily placed in a row, recorded on the copy-protected optical recording medium according to an exemplary embodiment of the present invention. In the exemplary embodiment shown in FIG. 4, the present invention is applied to the audio CD. As shown in FIG. 4, the copy-protected audio CD according to the present invention includes an audio session 100 in which the audio contents are stored, and further includes a first auxiliary session 102 and a second auxiliary session 104 for preventing the copy. The first and second auxiliary sessions 102 and 104 are arranged to store the control information for controlling the operation of the reproducing apparatus.

According to the embodiment, the audio session 100 includes a lead-in area with a TOC, a plurality of tracks (track 1 to track N) in which the audio content information is stored and a lead-out area.

Both first and second auxiliary sessions 102 and 104 include a lead-in area with a TOC, a first auxiliary track, a second auxiliary track and a lead-out area. The users can store certain information in the first and second auxiliary tracks as he or she wishes.

On the lead-in area of the audio session 100 with the TOC having the general structure, the control information for reproducing each of tracks (track 1 to track N) included in the audio session 100 is recorded. In the copy-protected audio CD according to the present invention, however, the control information guiding the recording/reproducing apparatus (not shown in drawing) to the first auxiliary session 102 is included in the TOC of the audio session 100.

The recording/reproducing apparatus is generally used, installed in the general computer system, and may be a CD-ROM driver. When the recording/reproducing apparatus understands the structure of the information recorded on the general optical recording medium, reads the information and extracts to copy, the recording/reproducing apparatus is controlled by the information recorded on the TOC.

The control information controlling the recording/reproducing apparatus is easily embodied by recording the value of "B0" onto the point field of the Q sub channel included in predetermined one of the frames recorded on the lead-in area of the audio session 100 and the address of the first auxiliary session 102 onto the absolute time code fields corresponding thereto.

Furthermore, in the audio CD according to the present invention the control information guiding the recording/reproducing apparatus to the second auxiliary session 104 is included in the TOC of the first auxiliary session 102. This control information, in the similar way above, is easily embodied by recording the value of "B0" onto the point field of the Q sub channel included in predetermined one of the frames recorded on the lead-in area of the first auxiliary session 102 and the address of the second auxiliary session onto the absolute time code fields corresponding thereto.

Furthermore, in the audio CD according to the present invention the control information guiding the recording/reproducing apparatus to the first auxiliary session 102 is included in the TOC of the second auxiliary session 104. This control information, in the similar way above, is easily embodied by recording the value of "B0" onto the point field of the Q sub channel included in predetermined one of the frames recorded on the lead-in area of the second auxiliary session 104 and the address of the first auxiliary session onto the absolute time code fields corresponding thereto.

Therefore, as the audio CD according to the present invention is inserted into the general audio reproducing apparatus (not shown in drawing), the reproducing apparatus normally reproduces the tracks (track 1 to track N) included in the audio session of the audio CD.

As the audio CD according to the present invention is inserted into the recording/reproducing apparatus, however, in order to copy the CD, the recording/reproducing apparatus understands the structure of the audio session 100 by reading the TOC of the audio session 100, then is leaded to the first auxiliary session 102, understands the structure of the first auxiliary session 102 by reading the TOC of the first auxiliary session 102, then is leaded to the second auxiliary session 102, understands the structure of the second auxiliary session 104 by reading the TOC of the first auxiliary session 102 and then is leaded to the first auxiliary session 102 again.

Therefore, the recording/reproducing apparatus reads the first auxiliary session 102 and the second auxiliary 104 repeatedly without end, so it cannot understand the structure of the audio CD according to the present invention in the end. This operation flow is shown in FIG. 4 with dashed lines.

In other words, the reproducing apparatus generally reproduces the audio information in disregard of the first auxiliary session 102 and the second auxiliary session 104 after the audio session 100 without any operation, even if it accesses the TOC of the recording medium. Therefore, only the audio session 100 on which the audio information is recorded is reproduced.

Meanwhile, the recording/reproducing apparatus such as a CD-ROM driver installed and operating in the computer system is capable of reading various types of information besides the audio information and is made for reading even the information including a number of sessions, but it, by manipulating the control information mentioned above, reads the first and second auxiliary session 102 and 104 repeatedly without end, so it cannot understand the structure of the audio CD according to the present invention.

The manipulation of the control information guiding the control flow above does not give any effect on the reproduction of the copy-protected audio CD according to the present invention by the reproducing apparatus due to the accordance with the Red Book Standard. Therefore, any problem does not arise on reproducing the audio CD according to the present invention by the general reproducing apparatus, which is known widely.

In case, however, of copying the information on the audio CD with the general recording/reproducing apparatus, the general recording/reproducing apparatus falls into the condition in which it cannot understand the information structure of the audio CD according to the present invention. Consequently, it fails to work to understand the information structure of the audio CD so that it is impossible to copy the contents recorded on the audio CD.

Figure 5:
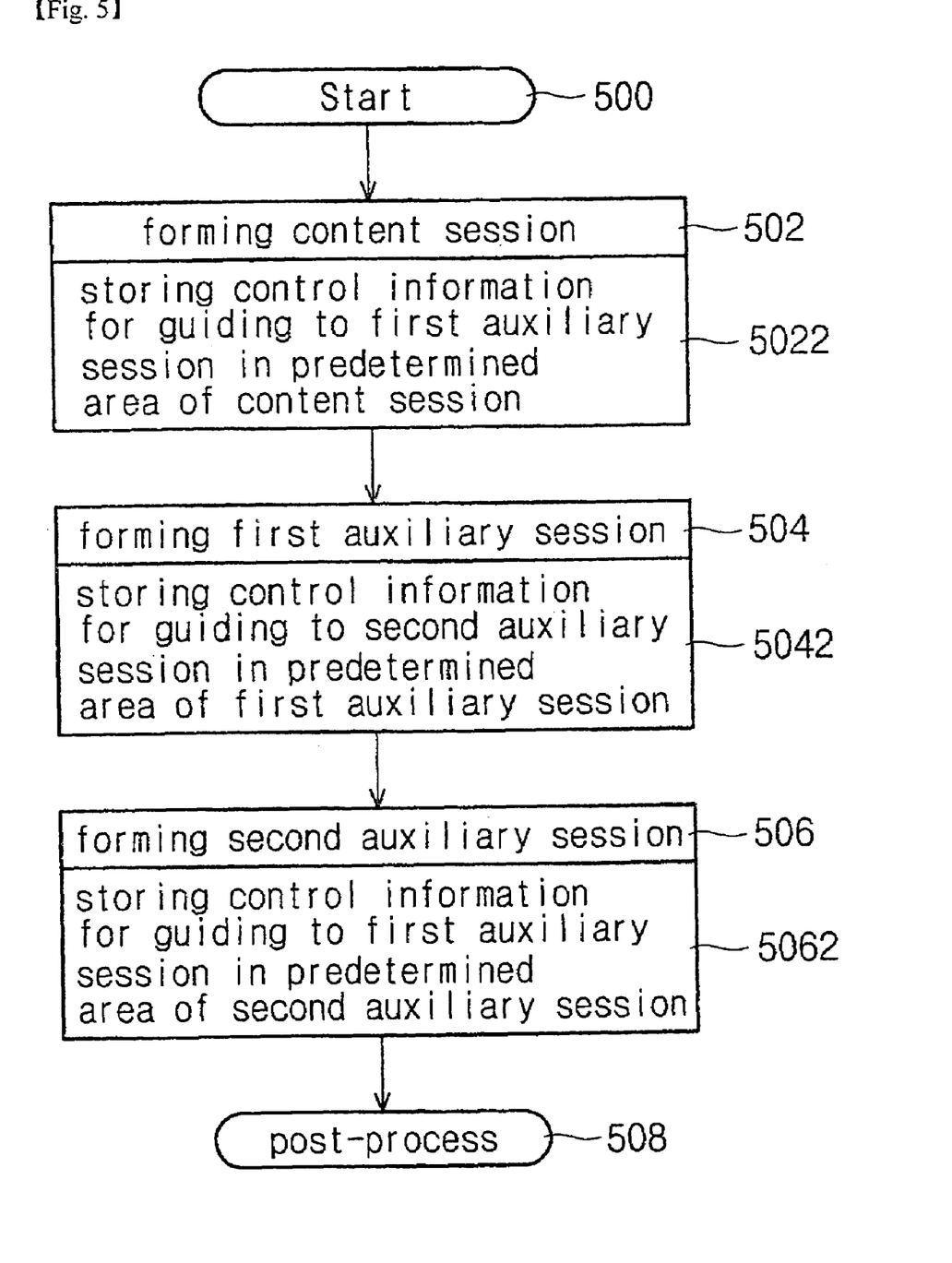
FIG. 5 is a schematic flow chart showing an exemplary embodiment of the method for manufacturing the copy-protected optical recording medium according to the present invention.

Next, an exemplary embodiment of the method for manufacturing the copy-protected optical recording medium according to the present invention will be described in detail below with FIG. 5. FIG. 5 is a schematic flow chart showing the exemplary embodiment of the method for manufacturing the copy-protected optical recording medium according to the present invention. As shown in FIG. 5, the manufacturing process of the copy-protected optical recording medium first starts (step 500), a pre-process is completed by the known method, and the content session on which the contents such as the audio contents are recorded is formed (step 502). According to this embodiment, the audio session 100 is formed in this step 502.

Particularly, in this step 502, it is included that the information guiding the recording/reproducing apparatus to the first auxiliary session is stored in a predetermined area of the content session (step 5022). According to this embodiment, the information guiding the recording/reproducing apparatus to the first auxiliary session 102 is included in the TOC of the audio session 100 in the step 5022.

The first auxiliary session then is formed (step 504). According to this embodiment, the first auxiliary session 102 is formed in this step 504. Particularly, in this step 504, it is included that the information guiding the recording/reproducing apparatus to the second auxiliary session is stored in a predetermined area of the first auxiliary session (step 5042). According to this embodiment, the information guiding the recording/reproducing apparatus to the second auxiliary session 104 is included in the TOC of the first auxiliary session 102 in the step 5042.

The second auxiliary session then is formed (step 506). According to this embodiment, the second auxiliary session 104 is formed in this step 506. Particularly, in this step 506, it is included that the information guiding the recording/reproducing apparatus to the first auxiliary session is stored in a predetermined area of the second auxiliary session (step 5062). According to this embodiment, the information guiding the recording/reproducing apparatus to the first auxiliary session 102 is included in the TOC of the second auxiliary session 104 in the step 5062.

Following the step 506, the post-process, which is known, is performed in respect of the method for manufacturing the copy-protected optical recording medium according to the present invention.

Meanwhile, due to the recent commercialization of the computer recordable optical recording medium, it is surely possible to prevent the illegal copying of the recorded information by performing the method according to the present invention when recording the information in the medium.

Figure 6:
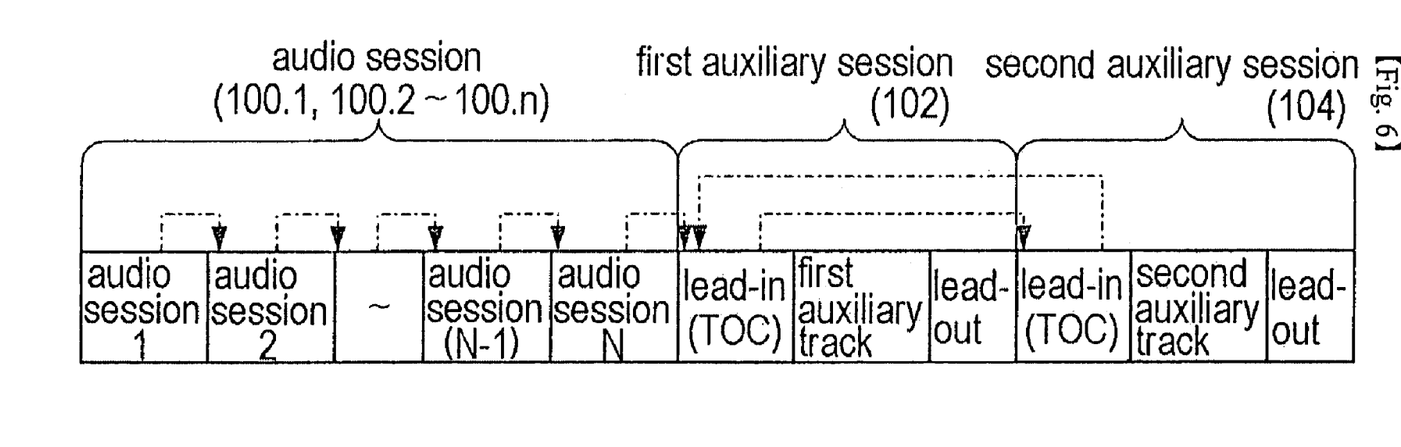
FIG. 6 shows the information, which is imaginarily placed in a row, recorded on the copy-protected optical recording medium according to another exemplary embodiment of the present invention.

Next, another embodiment of the present invention with FIG. 6 will be described in detail below. FIG. 6 shows the information, which is imaginarily placed in a row, recorded on the copy-protected optical recording medium according to another exemplary embodiment of the present invention. In this exemplary embodiment shown in FIG. 6, the present invention is applied to the audio CD including a number of the audio sessions. As shown in FIG. 6, the copy-protected audio CD according to the present invention includes a plurality of audio sessions 100.1, 100.2 . . . 100.n in which the audio contents are stored, and further includes a first auxiliary session 102 and a second auxiliary session 104 for preventing the copy. The audio sessions 100.1, 100.2 . . . 100.n include lead-in areas with TOCs, a plurality of tracks in which the audio content information is stored and lead-out areas. Moreover, both first and second auxiliary sessions 102 and 104 include a lead-in area with a TOC, a first auxiliary track, a second auxiliary track and a lead-out area.

On each of the lead-in areas of the audio sessions 100.1, 100.2 . . . 100.n with the TOCs having the general structure, the control information for reproducing each of tracks (not shown in drawing) included in the audio sessions 100.1, 100.2 . . . 100.n is recorded. In the copy-protected audio CD according to this embodiment, however, the control information guiding the reproducing apparatus and the recording/reproducing apparatus to the next session is included in each of the TOCs of the audio sessions 100.1, 100.2 . . . 100.(n−1) except the last audio session 100.n. the control information guiding the recording/reproducing apparatus to the first auxiliary session 102 is included in the TOC of the last audio session 100.n.

The control information is easily embodied by recording the value of "B0" onto the point field of the Q sub channel included in predetermined one of the frames recorded on each of the lead-in areas of the audio sessions 100.1, 100.2 . . . 100.n and the next audio session or the address of the first auxiliary session onto the absolute time code fields corresponding thereto.

Furthermore, also in the audio CD according to this embodiment the control information guiding the recording/reproducing apparatus to the second auxiliary session is included in the TOC of the first auxiliary session 102. This control information is also easily embodied by recording the value of "B0" onto the point field of the Q sub channel included in predetermined one of the frames recorded on the lead-in area of the first auxiliary session 102 and the address of the second auxiliary session onto the absolute time code fields corresponding thereto.

Furthermore, also in the audio CD according to this embodiment, the control information guiding the recording/reproducing apparatus to the first auxiliary session is included in the TOC of the second auxiliary session 104. This control information is also easily embodied by recording the value of "B0" onto the point field of the Q sub channel included in predetermined one of the frames recorded on the lead-in area of the second auxiliary session 104 and the address of the first auxiliary session onto the absolute time code fields corresponding thereto.

Therefore, as the audio CD according to the present invention is inserted into the recording/reproducing apparatus, the recording/reproducing apparatus operates toward the first auxiliary session 102 through the audio sessions 100.1, 100.2 . . . 100.n, then toward the second auxiliary session 104 and then repeatedly between the first auxiliary session 102 and the second auxiliary session 104 without end. This operation flow is shown in FIG. 6 with dashed lines.

Therefore, also in this embodiment, the manipulation of the control information guiding the operation flow above does not give any effect on the reproduction of the copy-protected audio CD according to the present invention by the reproducing apparatus due to the accordance with the Red Book Standard, while only in case of copying the contents in the audio CD the recording/reproducing apparatus falls into the condition in which it cannot understand the structure of the original CD so that it is impossible to copy the contents recorded on the audio CD.

Figure 7:
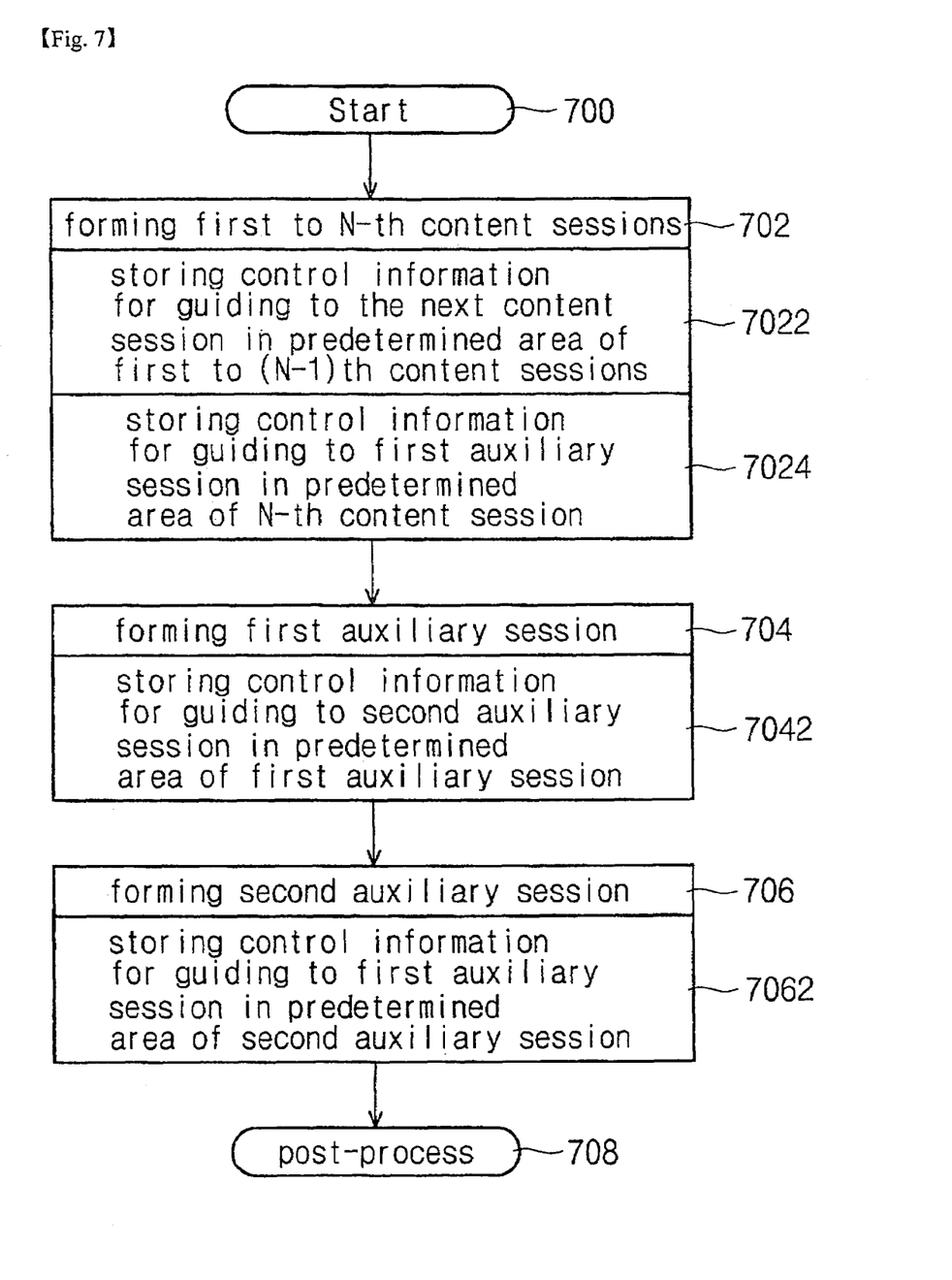
FIG. 7 is a schematic flow chart showing another exemplary embodiment of the method for manufacturing the copy-protected optical recording medium according to the present invention.

Next, another exemplary embodiment of the method for manufacturing the copy-protected optical recording medium according to the present invention will be described in detail below with FIG. 7. FIG. 7 is a schematic flow chart showing another exemplary embodiment of the method for manufacturing the copy-protected optical recording medium according to the present invention. As shown in FIG. 7, the manufacturing process of the copy-protected optical recording medium first starts (step 700), a pre-process is completed by the known method, and the content sessions on which the contents such as the audio contents are recorded are formed (step 702). According to this embodiment, the audio sessions 100.1, 100.2 . . . 100.n are formed in this step 702.

Particularly, in this step 702, it is included that the information guiding the reproducing apparatus and the recording/reproducing apparatus to the next content session is stored in a predetermined area of each of the content sessions except the last content session (step 7022). Moreover, the method includes a step of recording the information guiding the recording/reproducing apparatus to the first auxiliary session in a predetermined area of the N-th content session in the step 700 (step 7024). According to this embodiment, the information guiding the recording/reproducing apparatus to the next audio session is included in the TOCs of the audio sessions 100.1, 100.2 ... 100.n in the step 7022, and the information guiding the recording/reproducing apparatus to the first auxiliary session 102 is included in the TOC of the last audio session 100.n in the step 7024.

The first auxiliary session then is formed (step 704). According to this embodiment, the first auxiliary session 102 is formed in this step 704. Particularly, in this step 704, it is included that the information guiding the recording/reproducing apparatus to the second auxiliary session is stored in a predetermined area of the first auxiliary session (step 7042). According to this embodiment, the information guiding the recording/reproducing apparatus to the second auxiliary session 104 is included in the TOC of the first auxiliary session 102 in the step 7042.

The second auxiliary session then is formed (step 706). According to this embodiment, the second auxiliary session 104 is formed in this step 706. Particularly, in this step 706, it is included that the information guiding the recording/reproducing apparatus to the first auxiliary session is stored in a predetermined area of the second auxiliary session (step 7062). According to this embodiment, the information guiding the recording/reproducing apparatus to the first auxiliary session 102 is included in the TOC of the second auxiliary session 104 in the step 7062.

Following the step 706, the post-process, which is known, is performed in respect of the method for manufacturing the copy-protected optical recording medium according to the present invention.

Although the present invention has been described by way of exemplary embodiments, it should be understood that those skilled in the art might make many changes and substitutions without departing from the spirit and the scope of the present invention which is defined only by the appended claims.

INDUSTRIAL APPLICABILITY

According to the present invention, it is possible to provide a copy-protected optical medium capable of being reproduced without an additional reproducing apparatus and a method for manufacturing thereof.

The invention claimed is:

1. An optical recording medium protected from being copied by a general recording/reproducing apparatus but capable of being reproduced by a general reproducing apparatus, comprising:
   a content session in which content information to be reproduced by said reproducing apparatus is stored; and
   a first and second auxiliary sessions for preventing said recording/reproducing apparatus from copying said content information,
   wherein said content session comprises control information for guiding said recording/reproducing apparatus to said first auxiliary session therein,
   said first auxiliary session comprises control information for guiding said recording/reproducing apparatus to said second auxiliary session therein, and
   said second auxiliary session comprises control information for guiding said recording/reproducing apparatus to said first auxiliary session therein.

2. An optical recording medium as claimed in claim 1, wherein said content session is an audio session storing audio information.

3. An optical recording medium as claimed in claim 2, wherein said audio session comprises a lead-in area with a TOC (Table Of Contents), at least one track storing audio content information and a lead-out area, and
   said control information for guiding said recording/reproducing apparatus to said first auxiliary session is in said TOC of said audio session.

4. An optical recording medium as claimed in claim 3, wherein said control information for guiding said recording/reproducing apparatus is that
   a value of "B0" is recorded on a point field of Q sub channel of predetermined one of frames recorded on said lead-in area of said audio session, and
   the address of said first auxiliary session is recorded on absolute time code fields of said Q sub channel on which said value of "B0" is recorded.

5. An optical recording medium as claimed in claim 1, wherein both of said first and second auxiliary sessions comprise a lead-in area with a TOC, at least one auxiliary track and a lead-out area,
   said control information for guiding said recording/reproducing apparatus to said second auxiliary session is in said TOC of said first auxiliary session, and
   said control information for guiding said recording/reproducing apparatus to said first auxiliary session is in said TOC of said second auxiliary session.

6. An optical recording medium as claimed in claim 5, wherein said control information of said first auxiliary session for guiding said recording/reproducing apparatus is that
   a value of "B0" is recorded on a point field of Q sub channel of predetermined one of frames recorded on said lead-in area of said first auxiliary session, and
   the address of said second auxiliary session is recorded on absolute time code fields of said Q sub channel on which said value of "B0" is recorded,
   while said control information of said second auxiliary session for guiding said recording/reproducing apparatus is that
   a value of "B0" is recorded on a point field of Q sub channel of predetermined one of frames recorded on said lead-in area of said second auxiliary session, and
   the address of said first auxiliary session is recorded on absolute time code fields of said Q sub channel on which said value of "B0" is recorded.

7. An optical recording medium as claimed in claim 1, further comprising at least one content session in which content information to be reproduced by said reproducing apparatus is stored additionally,
   wherein each of said content sessions except the last content session comprises control information for guiding said recording/reproducing apparatus to the next content session, and
   said last content session comprises control information for guiding said recording/reproducing apparatus to said first auxiliary session.

8. A method for manufacturing an optical recording medium protected from being copied by a general recording/ reproducing apparatus but capable of being reproduced by a general reproducing apparatus, comprising the steps of:

(a) forming a content session in which content information to be reproduced by said reproducing apparatus is stored; and (b) forming a first and second auxiliary sessions for preventing said recording/reproducing apparatus from copying said content information, wherein control information for guiding said recording/reproducing apparatus to said first auxiliary session is stored in a predetermined area of said content session in said step (a), control information for guiding said recording/reproducing apparatus to said second auxiliary session is stored in a predetermined area of said first auxiliary session in said step (b), and control information for guiding said recording/reproducing apparatus to said first auxiliary session is stored in a predetermined area of said second auxiliary session in said step (b).

9. A method for manufacturing an optical recording medium as claimed in claim 8, wherein said content session is an audio session storing audio information.

10. A method for manufacturing an optical recording medium as claimed in claim 9, wherein said audio session comprises a lead-in area with a TOC (Table Of Contents), at least one track storing audio content information and a lead-out area, and said control information for guiding said recording/reproducing apparatus to said first auxiliary session is in said TOC of said audio session.

11. A method for manufacturing an optical recording medium as claimed in claim 10, wherein said control information for guiding said recording/reproducing apparatus is that a value of "B0" is recorded on a point field of Q sub channel of predetermined one of frames recorded on said lead-in area of said audio session, and the address of said first auxiliary session is recorded on absolute time code fields of said Q sub channel on which said value of "B0" is recorded.

12. A method for manufacturing an optical recording medium as claimed in claim 8, wherein both of said first and second auxiliary sessions comprise a lead-in area with a TOC, at least one auxiliary track and a lead-out area, said control information for guiding said recording/reproducing apparatus to said second auxiliary session is in said TOC of said first auxiliary session, and said control information for guiding said recording/reproducing apparatus to said first auxiliary session is in said TOC of said second auxiliary session.

13. A method for manufacturing an optical recording medium as claimed in claim 12, wherein said control information of said first auxiliary session for guiding said recording/reproducing apparatus is that a value of "B0" is recorded on a point field of Q sub channel of predetermined one of frames recorded on said lead-in area of said first auxiliary session, and the address of said second auxiliary session is recorded on absolute time code fields of said Q sub channel on which said value of "B0" is recorded, while said control information of said second auxiliary session for guiding said recording/reproducing apparatus is that a value of "B0" is recorded on a point field of Q sub channel of predetermined one of frames recorded on said lead-in area of said second auxiliary session, and the address of said first auxiliary session is recorded on absolute time code fields of said Q sub channel on which said value of "B0" is recorded.

14. A method for manufacturing an optical recording medium as claimed in claim 8, further comprising a step of forming at least one content session in which content information to be reproduced by said reproducing apparatus is stored additionally, wherein each of said content sessions except the last content session comprises control information for guiding said recording/reproducing apparatus to the next content session, and said last content session comprises control information for guiding said recording/reproducing apparatus to said first auxiliary session.

* * * * *